Nov. 17, 1964
R. C. BENTON
3,156,983
BINARY DECIMAL GAGE
Filed Aug. 13, 1962
4 Sheets-Sheet 1
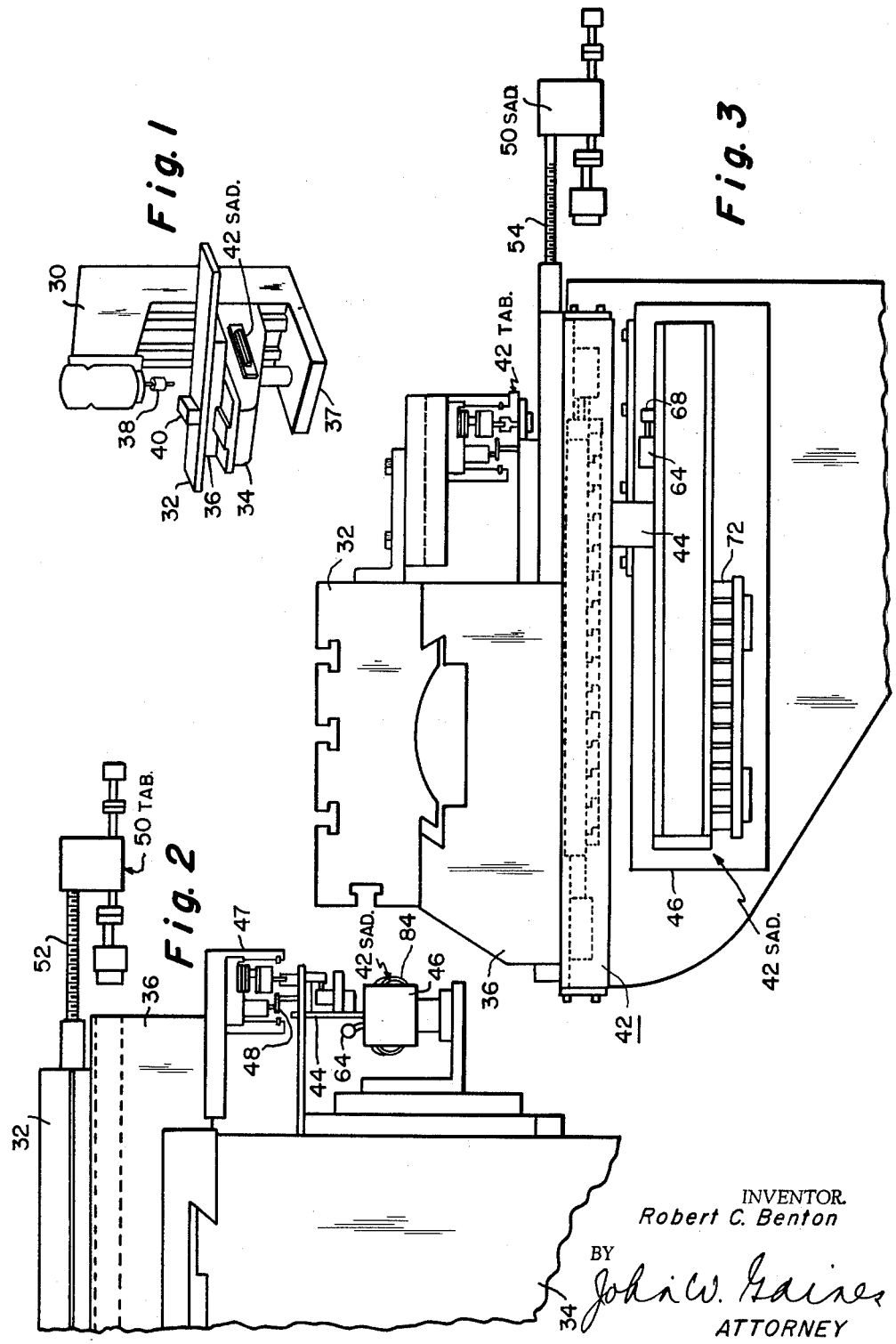
INVENTOR.
Robert C. Benton
BY John W. Gaines
ATTORNEY Nov. 17, 1964
R. C. BENTON
3,156,983
BINARY DECIMAL GAGE
Filed Aug. 13, 1962
4 Sheets-Sheet 2
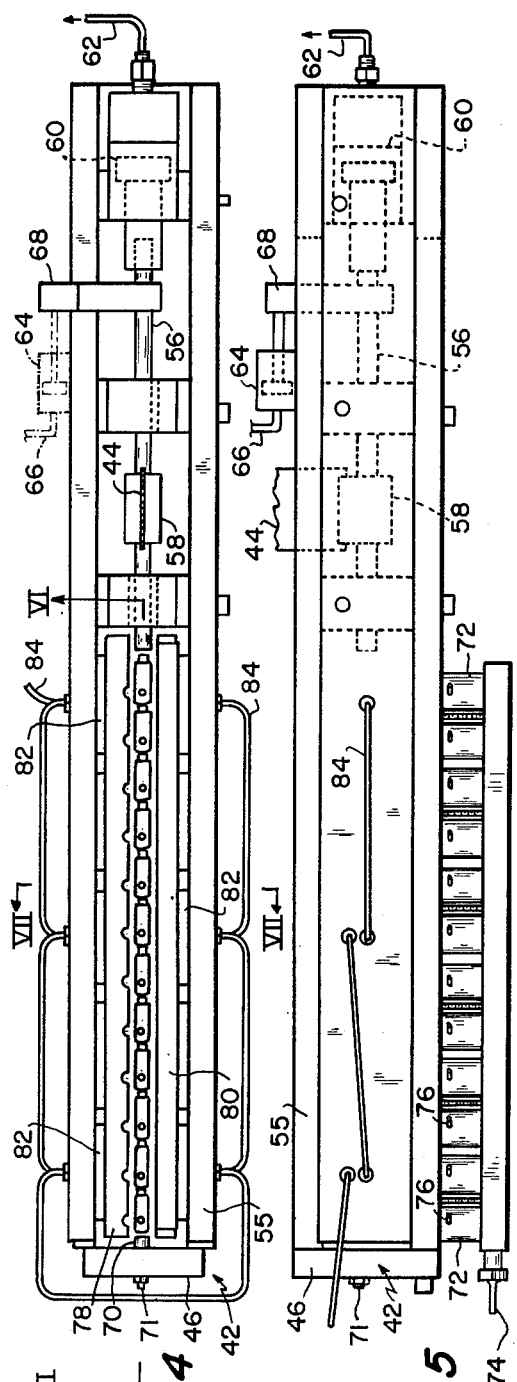
Fig. 4
Fig. 5
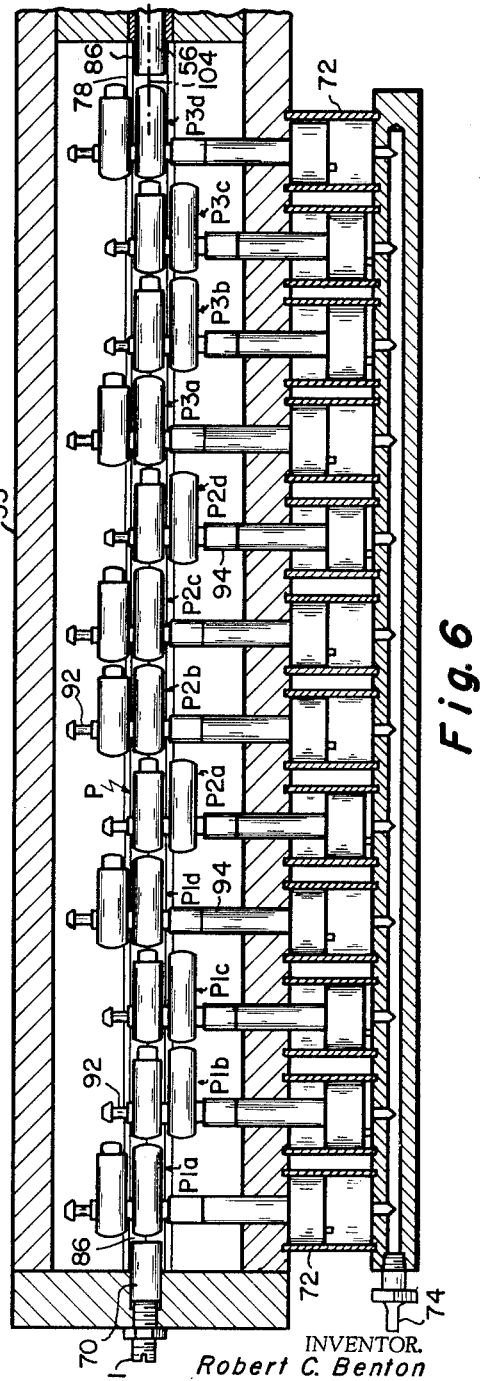
Fig. 6
INVENTOR.
Robert C. Benton
BY
John W. Gaines
ATTORNEY Nov. 17, 1964  R. C. BENTON  3,156,983
BINARY DECIMAL GAGE
Filed Aug. 13, 1962  4 Sheets-Sheet 3

INVENTOR.
Robert C. Benton
BY John W. Haines
ATTORNEY

Nov. 17, 1964  R. C. BENTON  3,156,983
BINARY DECIMAL GAGE

Filed Aug. 13, 1962  4 Sheets—Sheet 4

INVENTOR.
Robert C. Benton
BY John W. Gaines
ATTORNEY

United States Patent Office 3,156,983
Patented Nov. 17, 1964

3,156,983
BINARY DECIMAL GAGE
Robert C. Benton, State College, Pa., assignor to Centre Circuits, Inc., State College, Pa., a corporation of Pennsylvania
Filed Aug. 13, 1962, Ser. No. 216,617
14 Claims. (Cl. 33—125)

This invention relates to a binary decimal gage for accurately presetting the position of automatic, table-stopping pawls, or other table- or carriage-stopping mechanisms, and the like. The gage itself is automatic, presetting the location of the stopping mechanism accurately to a thousandth part or to a ten-thousandths part within some major unit of movement, such as one inch or one-half inch, for example.

The tables and carriages primarily contemplated are of a type adapted to support a workpiece and having universal rectilinear movement along two coordinate axes. The instant gage forms part of the control apparatus for positioning the table by orderly establishment of a sequence of large and small increment settings which are of a cumulative effect enabling the workpiece to be stopped at precisely the right decimal point or points for machining as desired. The stopping device senses the relative position of the table at the right time and stops it, always referenced with respect to the preset position of the stopping device and directly dependent upon the accuracy to which the device has been positioned by the gage.

It is an object of the present invention, in comparison to prior gage rod mechanisms, to avoid the exactitude of machining which is so much a characteristic of prior mechanisms. Heretofore, gages have been proposed of the decade-rod type and machining of each of the ten-rod elements per set of elements to an exact decimal length has created a substantial expense; the present binary system affords the same or higher accuracy by use of mere nominal lengths and with a minimum of close tolerances of manufacture. These present lengths, however, afford an exact decimal difference through a novel construction and arrangement as will now be explained. Also, I have found that by adapting the units of the instant gage system to direct response from binary coded signals, the customary number of ten units is reduced through use of combination actuation of fewer-than-ten units, thus reducing the number of parts and expense.

Various features, objects and advantages will be specifically pointed out or become apparent when, for a better understanding of the invention, reference is made to the following description taken in conjunction with the accompanying drawings which form a part hereof and in which:

FIGURE 1 is an isometric view of a machine tool embodying the gages of the present invention;

FIGURES 2 and 3 are front and side elevational views of the work piece carrying and positioning structure of the machine tool of FIGURE 1;

FIGURES 4 and 5 are top plan and side elevational views of a decimal gage in the positioning control;

Figures 7, 8:
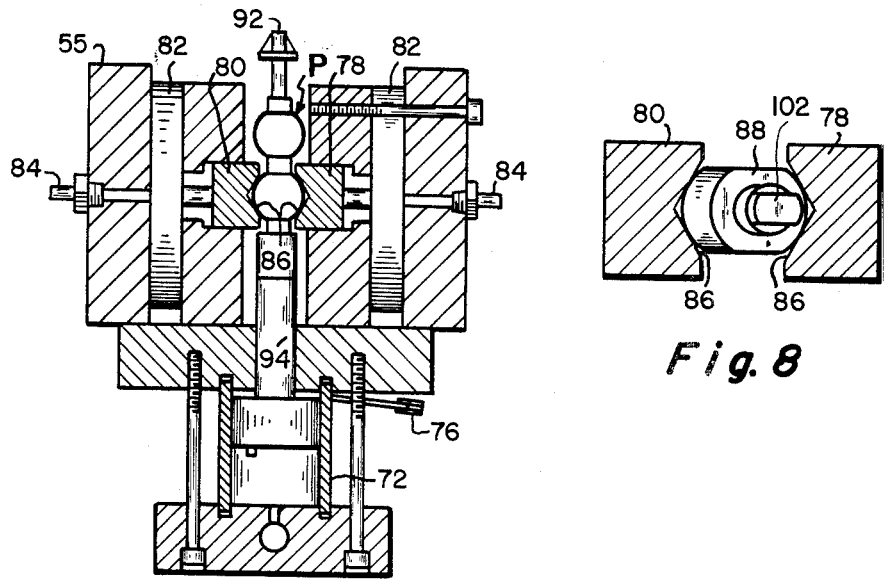
Figure 9:
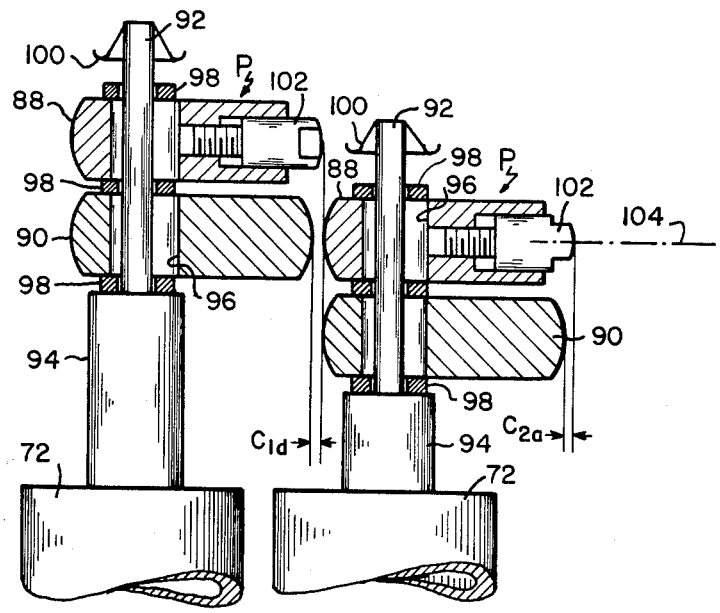
Figure 10:
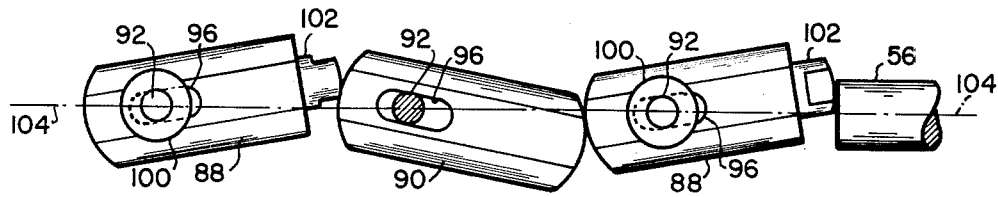
Figure 11:
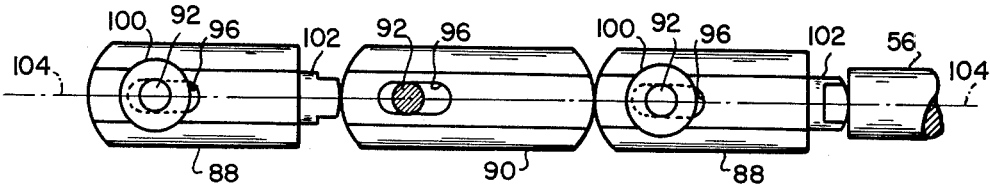
Figure 12:
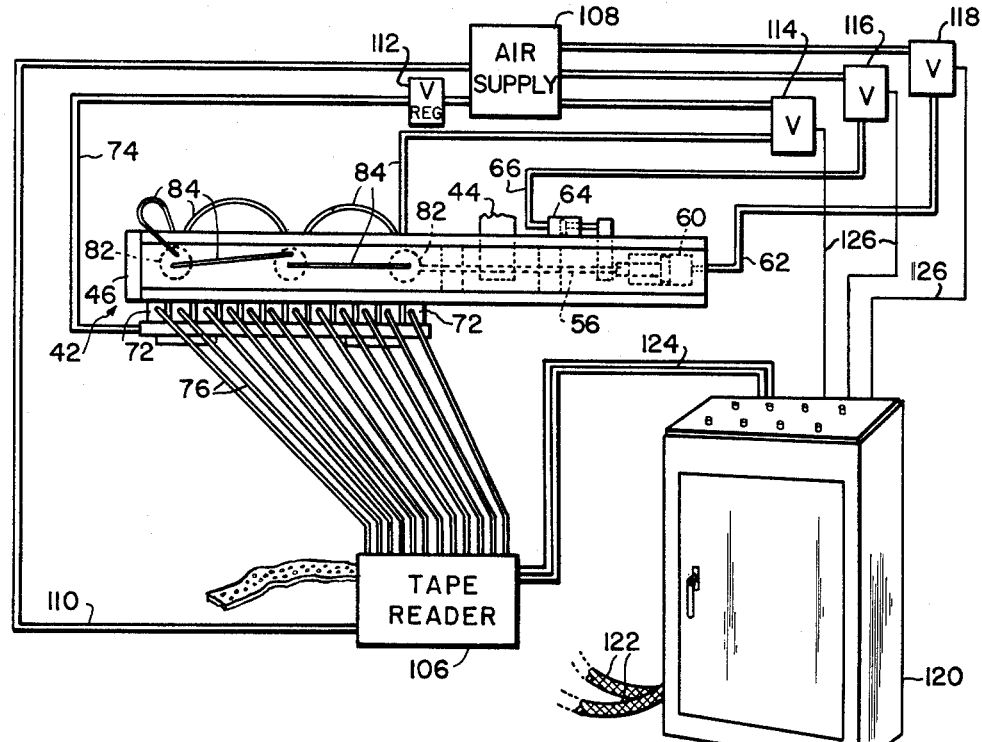

FIGURES 6 and 7 are longitudinal sectional and transverse sectional views respectively of the gage taken along the section lines 6—6 and 7—7 of FIGURE 4;

FIGURE 8 is an end view of a gage element in a skewed position prior to straightening;

FIGURE 9 is a longitudinal view of a number of the gage elements of FIGURE 6 but showing them in cross section and to enlarged scale;

FIGURE 10 corresponds to the operating condition of FIGURE 8 except it is a showing in plan view;

FIGURE 11 shows the retrograde displacement of the loading plunger 56, after the toggle effect of the elements has taken place due to the closing of the grooved clamps;

FIGURE 12 is a showing, partially schematic, of the overall control apparatus.

More particularly in FIGURE 1 of the drawings, a machine tool 30 selected herein by way of example consists of a vertical boring mill. It is equipped in a conventional way with a longitudinal table 32, a curved knee element 34 below the table, and a saddle 36 which supports the table 32 and which is supported by the knee element 34. These elements are carried by the base 37 of the machine tool 30 which further includes a motor-driven milling head 38 disposed above the table 32. The table 32 carries a work piece 40 clamped thereto to receive a work operation performed by the head 38.

As the saddle 36 moves horizontally with respect to the knee 34, it carries the work piece 40 to a proper position and is automatically stopped in response to a positioning control 42 sad. A similar positioning control 42 tab. (not shown) controls the position of the table 32 as the table moves along its longitudinal axis with respect to the saddle 36. The foregoing arrangement is known as a two-axis positioning table and, if milling in three dimensions if desired, the knee 34 can be moved and stopped with respect to the base 37 by means of another positioning control 42 knee (not shown).

In FIGURES 2 and 3, the positioning control 42 sad. includes a table-stopping device comprising a pawl plate 44 and a decimal difference gage 46 for presetting the position of the table-stopping device. The table-stopping device and the gage 46 are supported by the knee 34 in a cooperative relationship to an automatic gage 47 carried by the saddle 36. A carriage-stopping pawl 48 supported by the pawl plate 44 is operated by the gage 47 to sense the relative position of the saddle 36 (and the table 32 carried thereby) so as to stop the table motion along the axis of the movement of the saddle.

The automatic gage 47 forms no per se part of the present invention and can be an inch gage if desired, as for example the type generally as shown in copending Benton application S.N. 104,990 filed April 24, 1961. Briefly, according to the operation therein disclosed the gage 47 automatically actuates the pawl 48 so as to engage the right "inch" element or mark on the gage 47, for instance the eight-inch mark. Thereupon, the stopping pawl 48 by actuating a series of stopping switches terminates the table motion at a precise point always referenced to the preset position of the pawl 48. If, for example, the decimal gage 46 has been preset for 0.696 inch, the table will stop at a final position of 8.696 inches.

A similar positioning control 42 tab. (FIGURE 3) carried by the saddle 36 establishes cooperation with an automatic gage carried by the table 32 for stopping the drive of the table 32 along its longitudinal axis with respect to the saddle 36. A drive 50 tab. (FIGURE 2) controlled by dual input from a pair of motors operates a lead screw 52 to position the table 32 along one axis. Another drive 50 sad. (FIGURE 3) controlled by a dual motor input operates a lead screw 54 to position the table 32 along another axis by moving the saddle 36 supporting the table. The switches (not shown) operated by the respective stopping pawls are connected in appropriate circuits to control the respective dual motors of the drive 50 sad. and 50 tab.

In FIGURES 4 and 5, the decimal gage 46 of each positioning control, generally designated as 42, includes a longitudinally extending box-like frame 55 and an axially slidable loading shaft or plunger 56 therein. A shaft clamp 58 fits on the plunger 56 and supports the pawl plate 44 of the table-stopping device, the plunger 56 thus being included as an operating portion of the actual structure of the table-stopping device. A loading cylinder 60 is air operated through a line 62 to advance the plunger 56 toward a solidly abutting position against gage rod elements in the gage as hereinafter described. A reset cylinder 64 is air operated through a line 66 and by means of a connection 68 restores the plunger 56 into the reset or inactive position.

The loading plunger 56 as indicated forms part of the adjustable stopping device for the table and, in alignment therewith at the opposite or fixed end of the gage elements, there is provided a fixed stop device 70 secured in place by a set screw 71.

The gage rod elements referred to are selectively moved into initial alignment by automatic units consisting of air operated vertically acting pistons and cylinders 72 which are connected at one end to a common low-pressure air line 74 and at their opposite end to individual higher-pressure inlet lines 76. The pressure in each of the individual lines is either on or off in conformity with the present binary signal concept.

Horizontally movable grooved clamps 78 and 80 (FIGURE 4) for engaging the gage element are biased apart by springs, not shown, and are simultaneously operated so as to force the clamps together by means of individual air-operated clamping cylinders 82. Air lines 84 are connected in series as a manifold to simultaneously supply air to the cylinders 82 and they are secured to fittings in the side walls of the frame 55 of the gage 46.

In FIGURES 6 and 7 a pair of the gage rod elements is generally designated P, to which appropriate distinguishing subscripts are added when a specific one of the pairs is intended. Viewed from the left in FIGURE 6, a first group of the pairs consists of a pair P1a of which the difference in their length is 0.001 inch, a pair P1b of which their difference is 0.002 inch, a pair P1c of which their difference is 0.004 inch, and a pair P1d of which their difference is 0.008 inch. In a second group the difference between the respective pairs of elements P2a, P2b, P2c, and P2d increases but in hundredths of an inch, i.e. by 0.010", 0.020", 0.040", and 0.080" respectively. The difference pattern in a third group can follow the same as previously but read to tenths of an inch; as a practical matter to save space the elements P3c differ in length by 0.400 inch and the elements P3d differ by 0.400 inch, whereas the elements P3a differ by 0.100 inch and the elements P3b differ in length by 0.200 inch.

From the foregoing it is seen that the piston and cylinders 72 of the first group are operable by binary air signals to combine in affording a difference reading to a thousandth part of an inch, the illustrative combination of 0.003 inch, for example, being 0.001 plus 0.002 inch. To produce an accurate reading to the nearest hundredth of an inch, say 0.050, the difference achieved by adding 0.010 inch and 0.040 inch produces the desired result. These binary additions are believed obvious and so are the others necessary to produce every decimal fraction in 0.001" graduations through appropriate binary combinations. In the case of the variation described in connection with the third set only, a reading of 0.900 inch is produced from the addition of 0.100 plus 0.400 plus 0.400 inch.

In FIGURE 8, the grooved clamps 78 and 80 present inwardly facing, machined V grooves 86 with which the selected element of each pair P is brought to a common horizontal level by means of the pistons and cylinders 72 controlling each pair P of gage rod elements. The loading plunger 56 is applied, forcing the abutting elements selected, into a skewed position of horizontal alignment against the bottoms of the grooves 86. Then after the clamps 78 and 80 close as indicated in FIGURE 7, the selected gage elements are precisely coaxially aligned in a common horizontal plane and in a common vertical plane so as to register exactly with the stop devices at the respective opposite ends.

In FIGURE 9, the elements of each pair P consist of an adjustable element 88 and a fixed length gage element 90. An upstanding pin 92 on the associated piston rod 94 passes through elongated registering slots 96 in the elements. These elements are separated by spacers 98 and retained on the pins 92 by means of a retainer 100 fast to each pin. The elements 88 and 90 of each pair are spaced apart center to center by a distance equal to the stroke of the piston in the associated cylinder 72.

The adjustable element 88 is of two-part construction comprising a body and a twistable head 102 secured to the body by means of fine accurate threads. As long as the elements 88 and 90 are of the same order of lengths, it is immaterial whether their absolute lengths are very closely held in manufacture and they can differ quite widely from whatever nominal length is arbitrarily selected.

A tool is applied to rotate the head 102 of the element 88 so that, as the gage is being finally adjusted, the effective difference in lengths between the elements 88 and 90 of a pair P is accurately established. If the elements P on the left as viewed in FIGURE 9 form the last pair of the first group, their effective difference $C1d$ is set at the 0.008 inch previously indicated. In that case, the next successive set is the first pair of the second group, the difference in length of which is indicated by $C2a$ equalling 0.010 inch. Thus in the position shown in FIGURE 9, one pair P of the elements contributes a difference measurement $C2a$ referred to which is 0.010 inch whereas in the other pair the longer element 88 is in the inactive position so that there is an absence of its available difference measurement $C1d$ in the setting shown. The axis of alignment of the stop devices is indicated at 104.

FIGURES 10 and 11 are sequence views illustrating a toggle effect of the elements in positively taking up clearance as they are forcibly aligned in the vertical plane by the grooved clamps, not shown. Owing to provision of the slots 96 the elements freely force one another to adjust axially along the axis 104. The force behind the loading plunger 56 is simply air pressure and the plunger yields in response to this slight expansive movement of the elements along the grooves of the clamps as the clamps are closed. It will be appreciated that the necessary movement is reduced to a minimum by reason of the fact that the groups of pairs with the smallest difference in length are located nearer the fixed stop 70; the pairs P of elements affording the maximum length difference are arranged in increasing order of difference as they approach the plunger 56 constituting the adjustable stopping device.

In the system of FIGURE 12, a tape reader 106 serves as an input device supplying air through the lines 76 to to selected ones of the pistons and cylinders 72. The pistons in the cylinders take either one of two possible positions, being down or up respectively, depending on whether the binary air signal is an on-signal or an off-signal to that cylinder. A source of air supply 108 provides the tape reader with air through a line 110. A regulator 112 leading from the source 108 supplies the low pressure input line 74 so as to produce a common manifold pressure for the lower end of the pistons and cylinders 72. A solenoid valve 114 introduces air from the air supply 108 into the line 84 to operate the clamping cylinders 82 of the gage 46. Another solenoid valve 116 leading from the air supply source 108 admits air pressure into the line 66 for operating the reset cylinder 64 and another solenoid valve 118 controls air in the line 62 which operates the loading cylinder 60.

A programming console 120 has control connections 122 leading to various mechanisms and the respective dual drive motors on the milling machine, further connections 124 leading to the tape reader 106, and also connections 126 leading to the respective solenoid valves 114, 116 and 118. The console 120 controls the sequence of operations so that, among other things, the stopping device comprising the pawl plate 44 takes an accurately preset position according to tape reader input information. In the initial condition it will be assumed that the reset cylinder 64 has reset the stopping device preparatory to starting a cycle.

Appropriate operation of the console 120 causes the tape reader 106 to advance the tape and make the next reading. Appropriate ones of the lines 76 are pressurized with air so as to overcome the low pressure maintained in the manifold line 74 and cause each of the cylinders 72 to select a proper gage rod element in accordance with a pre-punched binary code reading on the tape. The console 120 operates the valve 118 so that the loading plunger forces the selected elements into their skewed positions in the bottoms of the clamp grooves 86. The solenoid valve 114 is then operated, by the console 120, so as to cause the clamps 78 and 80 to clamp the selected elements straight in line, thus moving the stopping device comprising the pawl plate 44 into preset position. This preset position can be anywhere within a one-inch full travel of movement, producing any setting of 0.000 inch up to and including 0.999 inch.

After the stopping pawl has stopped the table along the axis in point, the programming console 120 operates the valves 116 and 118 whereupon the resetting cylinder 64 resets the stopping device comprising the pawl plate 44 into an inactive position. The valve 114 is automatically reopened to vent the lines 84 thus unclamping the element of the gage 46. The cycle is then completed by appropriate machining of the work piece.

The operation is then repeated.

From the foregoing and particularly in reference to FIGURE 6, it is apparent that the present binary system automatically responds directly to binary signals originating from a tape reader and equally well from binary input of the manual or semi-atuomatic type. The four units or mechanisms of the first group of elements hereof respond in combination to provide ten decimal readings, the next four combine to provide ten decimal readings, and the remaining four combine to provide ten decimal readings. Each piston and cylinder mechanism of a respective group thus affords an extended and retracted position yielding a difference between its extended and retracted positions reading only to a common decimal place with respect to the others of that group; that decimal place is perforce different from the decimal place afforded by each of the other groups. If in FIGURE 6 all of the pairs of elements were in the upper position as typified by the two end pairs P1a and P3d of elements, the total difference reading would be 0.000 inch. As actually illustrated, however, the reading is 0.696 inch.

Variations within the spirit and scope of the invention described are equally comprehended by the foregoing description.

What is claimed is:

1. Gage mechanism comprising a consecutive series of binary sets of gage elements, the elements of each set being arranged in a plurality of pairs, and means for shifting a selected element of each pair of gage elements into a point of longitudinal alignment with the other selected elements for aggregating in length therewith an accurate gage reading desired.

2. Gage mechanism comprising a consecutive series of binary sets of gage elements, the elements of each set being arranged in a plurality of pairs, first means supporting the elements in an operative relationship so that the gage elements will establish a gage reading of the desired accuracy between devices at the opposite ends, and means for shifting a selected element of each pair of gage elements into a point of longitudinal alignment with said devices for aggregating in length with the other selected elements the accurate gage reading desired.

3. Gage mechanism comprising a consecutive series of binary sets of gage elements, the elements of each set being arranged in a plurality of pairs, a fixed stop device and an adjustable stopping device operatively related to the sets of gage elements so as to be held separated by engagement with the respective opposite ends of the series, first means supporting the elements and said devices in the operative relationship described so that the stop device and intervening series of gage elements establish a gage reading determining the position of the adjustable stopping device, and means for shifting a selected element of each pair of gage elements into a point of longitudinal alignment with said devices for aggregating in length, with the other selected elements, the completeness of the gage reading desired.

4. Gage mechanism according to claim 3, said elements being longitudinally elongated and loosely supported by said first means, and means for laterally clamping the selected elements when occupying their point of alignment, so as to bring their axes into coincidence thus exerting a toggle effect in moving the stopping device to a final position corresponding to the length of the selected elements in the aggregate.

5. Gage mechanism comprising a consecutive series of binary sets of gage elements, the elements of each set consisting of four pairs of elements, a fixed stop device and an adjustable stopping device operatively related to the sets of gage elements so as to be held separated by engagement with the respective opposite ends of the series, first means supporting the elements and said devices in the operative relationship described so that the fixed stop device and the intervening series of gage elements establish the position of the adjustable stopping device, the elements of each pair within each set of elements differing by an exact decimal difference equal to 0.001 or some whole multiple thereof, and means for shifting a selected element of each pair of gage elements into a point of longitudinal alignment with said devices for aggregating in length with the other selected elements the decimal reading desired.

6. Gage mechanism comprising a consecutive series of binary sets of gage elements, the elements of each set being arranged in a plurality of pairs all of which comprise four pairs of elements and in at least a majority of which the elements in the respective first, second, third and fourth pairs are different proportionally in length in the order of 1, 2, 4, and 8 respectively, thereby having a binary capability in appropriate combinations to yield all ten decimal readings of one place, a fixed stop device and an adjustable stopping device operatively related to the sets of gage elements so as to be held separated by engagement with the respective opposite ends of the series, first means supporting the elements and said devices in the operative relationship described so that the fixed stop device and the intervening series of gage elements will establish the ultimate position of the adjustable stopping device referenced thereto, and means for shifting a selected element of each pair of gage elements into a point of longitudinal alignment with said devices for aggregating in length with the other selected elements the decimal reading desired.

7. Gage mechanism comprising a consecutive series of binary sets of gage elements, the elements of each set being arranged in a plurality of pairs, one element of each pair having a fixed length of relatively inexact value, the other element being of a bipartite construction which is characterized by a relatively inexact absolute length and which has a precise means of adjustment whereby it is set to differ by an exact decimal difference from the length of the one element, and means for shifting a selected element of each pair of gage elements into a point of longitudinal alignment with respect to, and aggregating in length with, the other selected elements so that said cumulative gage reading includes the individual differences or not as selected.

8. Gage mechanism having a fixed stop and an adjustable stop at the respective opposite ends, medially movable side clamps in said gage disposed substantially at the level of said stops, a series of vertically actuable pistons and cylinders disposed in the base of the gage, and a consecutive series of binary sets of gage elements between the stops and between the clamps and carried in pairs by the respective pistons and cylinders, one element of each pair having a fixed length of relatively inexact value, the other element being of a bipartite construction which is characterized by a relatively inexact absolute length and which has a precise means of adjustment whereby it is set to differ by an exact decimal difference from the length of the one element, said pistons and cylinders effective to select which element of each pair is brought into horizontal alignment with the stops and said clamps.

9. An elongated gage having an adjustable stop and a fixed stop disposed at the opposite ends respectively, medially movable side clamps disposed at the level of said stops, a series of selector pistons and cylinders which are vertically movable and located in the vertical plane of the stops, a consecutive series of binary sets of gage elements between the stops and between the clamps and carried in pairs by the respective pistons and cylinders, there being at least four sets of the gage elements each of which comprises four pairs of elements, wherein the lengths of the first pair have a difference, the lengths of the second pair have a difference, the lengths of the third pair have a difference, and the lengths of the fourth pair have a difference of decimal magnitude in the respective order to one another of 1, 2, 4, and 8, respectively, thereby being capable in appropriate combination to yield all ten decimal readings of one place, said pistons and cylinders effective to select the element of each pair brought into horizontal alignment with the stops and clamps.

10. In a decimal gage, said gage having two stops, the distance between which is controlled by intervening gage elements: an element having a first end, and having a head on the opposite end, and means of adjustment to change the length of the element between its ends whereby it differs by an exact amount from a companion element, and means supporting said element and its companion element for selectively moving one or the other into line with said stops.

11. In a gage, two elements according to claim 10, each element being formed with a longitudinally extending vertical slot, said selector means comprising a pin extending through registering slots of the elements for controlling their vertical position but allowing them freedom to turn and to slide in a horizontal plane.

12. In a gage having a longitudinally extending frame, a consecutive series of binary sets of gage elements, a pair of laterally retracted side clamps extending lengthwise of said frame in a cooperative relation with respect to said elements, vertically movable means in said frame supporting said elements in pairs so as to selectively move one element of each pair into horizontal alignment with the clamps, a fixed stop and an adjustable stop at opposite ends of the frame effective for relative movement toward one another so as to move the selected elements into contact with one another and with the retracted clamps, and means to medially advance the clamps forcing said selected elements to seek alignment in a vertical plane thus forcing the stops an accurately gaged, relative distance apart.

13. In a binary gage, a pair of gage elements for interposition with respect to two stops, one of said elements having a fixed length, the other being adjustable in length so that the difference in lengths is a predetermined decimal amount, and binary means for selectively positioning either element in the line of interposition with respect to said stops.

14. In a machine tool of the type in which workpiece carrying means causes shifting, in accordance with digital code, of the workpiece from point to point for desired work operations:

a binary-to-decimal positioning device for a part which has a reference position when it is advanced in a horizontal path of movement toward a stop and which is withdrawn after the workpiece reaches some point;

said device comprising a plurality of pairs of gage elements which vary such that any desired length of a fixed increment up to a predetermined maximum may be formed by placing a combination of said gage elements alined in end-to-end relation in the path of movement of said part abutting and extending away from the stop;

the pairs individually comprising upper and lower elements of which each upper gage element exceeds the lower element by a predetermined decimal difference in length, each pair being vertically shiftable to place a selected element into line in the desired way with elements of the other pairs;

means for supporting the lower gage elements in the alined relation thereby establishing a minimum length for zero reference purposes;

a plurality of actuating means for withdrawing the lower element of a pair and replacing it with the selected upper element of the pair in line with the path of movement of the part to be advanced such that the part advances to its reference position as determined by the combined length of the alined gage elements; and signal-emitting binary tape reading mechanism providing output signals corresponding to said digital code for selectively activating the actuating means.

References Cited by the Examiner

UNITED STATES PATENTS 2,932,088    4/60    Knosp _____ 33—125

FOREIGN PATENTS 25,785    3/53    Finland.

ISAAC LISANN, *Primary Examiner.*